US011110767B2

(12) United States Patent
Bickel et al.

(10) Patent No.: US 11,110,767 B2
(45) Date of Patent: Sep. 7, 2021

(54) SUPPORT BEARING OF A VIBRATION DAMPER IN A WHEEL SUSPENSION OF A VEHICLE

(71) Applicant: Bayerische Motoren Werke Aktiengesellschaft, Munich (DE)

(72) Inventors: Martin Bickel, Munich (DE); Mike Steinbock, Scheuring (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 64 days.

(21) Appl. No.: 16/583,461

(22) Filed: Sep. 26, 2019

(65) Prior Publication Data
US 2020/0016949 A1    Jan. 16, 2020

Related U.S. Application Data

(63) Continuation of application No. PCT/EP2018/054188, filed on Feb. 20, 2018.

(30) Foreign Application Priority Data

Mar. 27, 2017    (DE) .................... 10 2017 205 091.8

(51) Int. Cl.
*B60G 13/00*        (2006.01)
*B60G 15/06*        (2006.01)

(52) U.S. Cl.
CPC ...... *B60G 13/003* (2013.01); *B60G 2204/128* (2013.01); *B60G 2206/73* (2013.01)

(58) Field of Classification Search
CPC .. B60G 13/003; B60G 15/067; B60G 15/068; F16F 9/54

(Continued)

(56) References Cited

U.S. PATENT DOCUMENTS 3,913,649 A    10/1975  Stanaitis
4,897,006 A *  1/1990   Blin ....................... B30B 1/00
                                                              411/368

(Continued)

FOREIGN PATENT DOCUMENTS

DE    384816 A    11/1923
DE    1 780 504 A1  2/1972

(Continued)

OTHER PUBLICATIONS

German-language Search Report issued in German Application No. 10 2017 205 091.8 dated Jul. 6, 2020 with partial English translation (13 pages).

(Continued)

*Primary Examiner* — Thomas J Williams
(74) *Attorney, Agent, or Firm* — Crowell & Moring LLP

(57) ABSTRACT

A support bearing of a vibration damper in the wheel suspension of a vehicle has a support bearing flange supported and force-fittingly attached on a body structure of the vehicle. The support bearing flange engages around an annular elastomer element in which the damper piston rod is suspended. With an annular collar which forms a hollow cylinder and the cylinder axis of which is at least approximately coincident with the longitudinal axis of the vibration damper, the support bearing flange penetrates a through-opening in the body structure so far that a nut or a support bearing cover designed as a union nut is screwed on a thread provided on the outer wall of the collar. With a clamping aid element interposed, the nut or support bearing cover draws the support bearing flange towards the body structure in a manner supported on the body structure such that a peripheral ring section of the body structure, which surrounds the through-opening, is clamped between the support bearing flange and the clamping aid element and ultimately the nut or the support bearing cover. As an alternative to the (Continued)

clamping aid element or in addition to same, the collar has a shape that increases its elasticity in the direction of the longitudinal axis of the thread.

4 Claims, 3 Drawing Sheets

(58) Field of Classification Search
USPC .............................. 188/321.11; 280/124.147
See application file for complete search history.

(56) References Cited

U.S. PATENT DOCUMENTS

| | | | |
|---|---|---|---|
| 5,350,183 A | | 9/1994 | Shealy |
| 5,678,810 A | * | 10/1997 | Summers, III ..... B60G 17/0521 267/220 |
| 6,382,645 B1 | * | 5/2002 | Gravelle .............. B60G 15/068 280/124.147 |
| 7,066,456 B2 | * | 6/2006 | Hodumi ............... B60G 13/003 267/140 |
| 2004/0089990 A1 | | 5/2004 | Labeau |

FOREIGN PATENT DOCUMENTS

| | | |
|---|---|---|
| DE | 41 40 936 A1 | 6/1993 |
| DE | 197 19 301 A1 | 11/1998 |
| DE | 10 2005 014 325 A1 | 10/2006 |
| DE | 10 2008 010 541 A1 | 9/2009 |
| DE | 10 2012 002 806 A1 | 5/2013 |
| DE | 10 2014 218 800 A1 | 3/2016 |
| GB | 857611 A * | 1/1961 ................ F16F 1/32 |

OTHER PUBLICATIONS

Waelzlager, SKF, 2014, https://www.skf.com/binaries/pub41/Images/0901d1968035fe76-Waelzlager---10000_2-DE_tcm_41-121436.pdf#cid-121486, three pages.

International Search Report (PCT/ISA/210) issued in PCT Application No. PCT/EP2018/054188 dated May 25, 2018 with English translation (seven pages).

German-language Written Opinion (PCT/ISA/237) issued in PCT Application No. PCT/EP2018/054188 dated May 25, 2018 (nine pages).

* cited by examiner

SUPPORT BEARING OF A VIBRATION DAMPER IN A WHEEL SUSPENSION OF A VEHICLE

CROSS REFERENCE TO RELATED APPLICATIONS

This application is a continuation of PCT International Application No. PCT/EP2018/054188, filed Feb. 20, 2018, which claims priority under 35 U.S.C. § 119 from German Patent Application No. 10 2017 205 091.8, filed Mar. 27, 2017, the entire disclosures of which are herein expressly incorporated by reference.

BACKGROUND AND SUMMARY OF THE INVENTION

The invention relates to a supporting bearing of a vibration damper or a damper/spring unit in the wheel suspension system of a vehicle. The supporting bearing has a supporting bearing flange which is supported on and fastened in a non-positive manner to a vehicle body structure of the vehicle, which supporting bearing flange engages around an annular elastomer element, in which an element of the damper and, in particular, its piston rod are suspended. With respect to the prior art, in addition to DE 10 2014 218 800 A, DE 10 2008 010 541 A1 and DE 10 2012 002 806 A1, reference is made, in particular, to DE 197 19 301 A1.

A non-positive attachment of the damper supporting bearing on the vehicle body by means of usually a plurality of, for example three, screws which, distributed in an annular manner about the longitudinal axis of the vibration damper, brace what is known as the supporting bearing flange against a contact face of the vehicle body structure is fundamentally widespread and is also disclosed in the cited documents. Here, for reasons of rigidity and strength, the diameter of the ring which is formed by way of the (usually three) fastening screws has to be selected to be relatively great, which can be disadvantageous on account of the installation space requirement. An arrangement which is known from DE 197 19 301 A1 above with a central screw connection is more advantageous in this regard. It has been shown, however, that there is a need for improvement here, in order to design said central screw connection to be absolutely secure.

This need is met by way of a supporting bearing according to the invention wherein a measure for increasing the prestressing force in the threaded connection between the supporting bearing nut and the collar is provided, which measure goes beyond the design of the supporting bearing nut and the thread, for which purpose the collar has a shape which increases its elasticity in the direction of the longitudinal axis of the thread, and/or for which purpose an auxiliary clamping element is clamped in between the supporting bearing nut and the vehicle body structure.

Instead of a plurality of screws which are provided in the common state of the art and establish the non-positive connection between the supporting bearing flange and the vehicle body structure, a central screw connection (which is likewise already known) is realized, with an element which is designed in the manner of a nut (called a supporting bearing nut here) or a union nut, a union nut configuration also being called a supporting bearing cover in the present case. The element has an internal thread, to which it is screwed by way of the supporting bearing flange which is designed suitably, namely is provided with what is known here as a collar. The collar has a corresponding external thread and protrudes in a circular (circularly annular) manner from a vehicle body contact face of the supporting bearing flange through a passage opening in the vehicle body structure in a projecting manner to and in the direction of the damper longitudinal axis. The result is that a ring segment (called an edge ring section) of the vehicle body structure which surrounds the passage opening is clamped in after the element (supporting bearing nut or union nut or supporting bearing cover) is screwed fixedly on the collar.

Here, what is known as an auxiliary clamping element can be provided between said element, namely the supporting bearing nut or union nut or the supporting bearing cover on one side and the edge ring section (the vehicle body structure) on the other side, which auxiliary clamping element can act firstly as a non-positive screw safeguard, in a similar manner to a spring washer or a cup spring which is used for purposes of this type, and which always ensures a sufficient clamping force between the supporting bearing nut (or the like) and the supporting bearing (or its collar). As an alternative or in addition, the supporting bearing flange can be suitably of at least slightly elastically deformable configuration in order to ensure a clamping force (with regard to the edge ring section of the vehicle body structure) which is sufficient under all circumstances between the supporting bearing nut and said supporting bearing flange.

Therefore, the supporting bearing flange can penetrate a passage opening in the vehicle body structure with a circularly annular collar which forms a hollow cylinder and the cylinder axis of which coincides at least approximately with the longitudinal axis of the vibration damper, to such an extent that a nut (called a supporting bearing nut) or a supporting bearing cover which is designed in the manner of a union nut can be screwed and is screwed onto a thread which is provided on the outer wall of said collar, which (supporting bearing) nut or supporting bearing cover pulls the supporting bearing flange toward the vehicle body structure in a manner which is supported on the vehicle body structure with an auxiliary clamping element being positioned in between, with the result that an edge ring section of the vehicle body structure, which edge ring section surrounds the passage opening, is clamped in between the supporting bearing flange and the auxiliary clamping element.

As an alternative or in addition to the above-described proposal, said collar can have a shape which increases its elasticity in the direction of the longitudinal axis of the thread, with the result that no auxiliary clamping element is possibly required. A supporting bearing nut which is screwed onto the thread on the outer wall of said collar or a supporting bearing cover which is designed in the manner of a union nut is also provided here, which pulls the supporting bearing flange toward the vehicle body structure in a manner which is supported on the vehicle body structure (ultimately, that is to say possibly with a further component being connected in between), with the result that an edge ring section of the vehicle body structure, which edge ring section surrounds the passage opening, is clamped in securely and reliably between the supporting bearing flange and the supporting bearing nut or the supporting bearing cover.

By said collar of the supporting bearing flange being slightly elastically deformable as viewed in the direction of the longitudinal axis of said thread (which is provided on the collar and interacts with the supporting bearing nut) and/or having a shape which increases its elasticity, that is to say is of expandable configuration (with respect to another section of the supporting bearing flange, by way of which section said supporting bearing flange bears against the vehicle body structure on the side which lies opposite the supporting bearing nut), the prestress during bracing is increased significantly, whereby a secure screw connection is produced.

Here, an expansion of this type during the bracing of the screw connection can also be promoted by the fact that weakened material portions or material cutouts are provided in the transition region between what is known as a basic structure of the supporting bearing flange and said collar, which weakened material portions or material cutouts make it possible for the collar to be stretched during tightening of the supporting bearing nut and/or to move at least slightly away from the basic structure of the supporting bearing flange. In this way, as in the case of the provision of an auxiliary clamping element, a central screw connection according to the invention is also secured or can be secured in a non-positive manner over the entire service life of the vehicle under all possible operating states, by it being possible for an embedding force loss (between the surfaces which are braced against one another) which results from possible "embedding" to be compensated for by way of the prestress according to the invention.

It is known that even standardized spring rings were provided in earlier times for a purpose of this type, namely as a non-positive screw securing means, which spring rings have proven to be not very effective, however. An auxiliary clamping element which is proposed in the present case or a suitably elastic configuration of the supporting bearing flange or its collar is effective, in contrast. Here, an auxiliary clamping element can preferably be designed in such a way that, for example, it is of similar design to a cup spring and therefore (actually) acts as an additional clamping element during the bracing of the screw connection between the supporting bearing flange and said supporting bearing nut (or union nut or supporting bearing cover). In addition, a proposed auxiliary clamping element can act as a washer and can therefore prevent that a paint layer which is applied or has been applied to said edge ring section of the vehicle body before the screw connection according to the invention of the supporting bearing flange is produced is damaged by way of the tightening of said supporting bearing nut or union nut or the like. On account of the simpler accessibility, the supporting bearing flange is preferably plugged with its collar through the passage opening from that side of the vehicle body structure which faces the vibration damper or the wheel suspension system.

If the auxiliary clamping element has an annular flange which lies on the vehicle body structure and a hollow-cylindrical so-called force transmission section which adjoins said annular flange directly or indirectly via what is known as a transition section, extends in the direction of the longitudinal axis of the thread toward the supporting bearing nut or toward the union nut (supporting bearing cover), and the diameter of which is smaller than the external diameter or a mean diameter of the annular flange, the diameter which acts between the auxiliary clamping element and the vehicle body structure can be selected to be sufficiently great with regard to a sufficiently pronounced bracing action and high rigidity and strength, and nevertheless requires less installation space than a screw connection which has been customary up to now with a plurality of screws which are arranged in an annular manner. In contrast, the friction area between the auxiliary clamping element and the supporting bearing nut which acts on it lies on a smaller diameter (than that of the annular flange of the auxiliary clamping element), with the result that lower friction losses occur during screwing or bracing than if the supporting bearing nut itself had a diameter of the size of the (for example, mean) diameter of the annular flange of the auxiliary clamping element. (Here, the mean diameter of the annular flange is the mean value between its external diameter and its internal diameter). In addition, as a result of the spring travel (of the cup spring) which is made possible, the auxiliary clamping element allows it to be possible for the build-up of the torque which is required for a secure non-positive connection to be generated over a larger angular range. Since a resilience is namely provided within the screw connection by way of the auxiliary clamping element, this results in an increased number of revolutions of the supporting bearing nut, for which reason a predefined tightening torque can be maintained more exactly during assembly.

A particularly advantageous and desired spring action of the auxiliary clamping element can be produced if the auxiliary clamping element has, as viewed from the outside, a linear or convexly or particularly advantageously concavely curved transition section between the annular flange and the hollow-cylindrical force transmission section, which transition section is inclined with respect to the longitudinal axis of the thread and, as viewed from the longitudinal axis of the thread, likewise runs in an inclined manner with respect to the longitudinal axis of the thread, in such a way that, as viewed in the axial direction of the thread, the force transmission section does not lie on the edge ring section of the vehicle body structure. In this way, the auxiliary clamping element is shaped in the manner of a cup spring and has a spring property in the direction of the longitudinal axis of said thread. Here, the wall thickness, in particular, of the transition section can be suitably specified or designed with regard to a desired spring rate.

In this context, a further design scope opens up if a plurality of reinforcing ribs are provided on the auxiliary clamping element between the annular flange and the hollow-cylindrical force transmission section and/or, in particular, on the transition section, as viewed in the circumferential direction. As viewed in a projection onto said thread longitudinal axis, said ribs might run in the direction of the latter, but actually in an inclined manner with respect to the latter. Here, ribs of this type can be provided, in particular, on the transition section on the outer side (that is to say, on the side which faces away from the thread longitudinal axis) or on the inner side (that is to say, on the side which faces the thread longitudinal axis). It goes without saying that other reinforcing measures are likewise possible. In particular, a desired spring action (and therefore prestressing force) with a sufficient strength can also be set by way of a suitable material selection or a combination of various materials for various constituent parts, in particular of the auxiliary clamping element, but also of the supporting bearing flange.

As has already been mentioned, the latter can also be achieved, as an alternative or in addition, by way of a spring action of the supporting bearing flange itself, however. For this purpose, in particular, said collar of the supporting bearing flange can have a certain elasticity or an elasticity which is increased by way of suitable measures, with the result that it is deformed or stretched, in particular, in the direction of the longitudinal axis of the associated or said thread during the bracing of the non-positive screw connection. For this purpose, in addition to a suitable material property, a suitable shape can also be provided, in particular, this relating not only to the collar itself, but rather also to its arrangement or incorporation in the supporting bearing flange. For example, an elasticity-increasing shape of this type of the collar can be formed by way of a plurality of sectors or segments with a reduced wall thickness in comparison with an adjoining section; a reduced wall thickness is also to be understood to mean a complete aperture in sections without any material.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
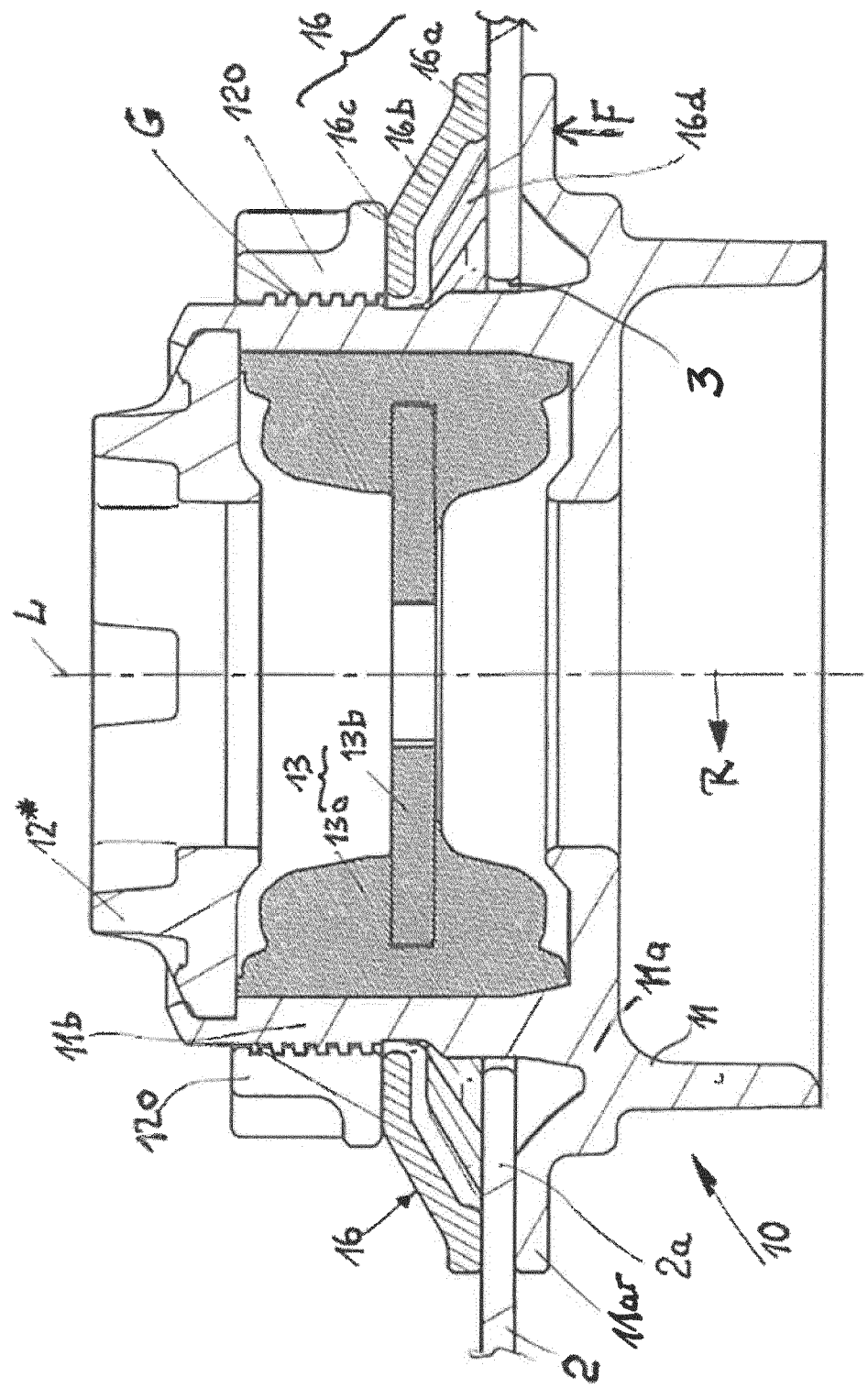
FIG. 1 is a section view of a first exemplary embodiment.
Figure 2A:
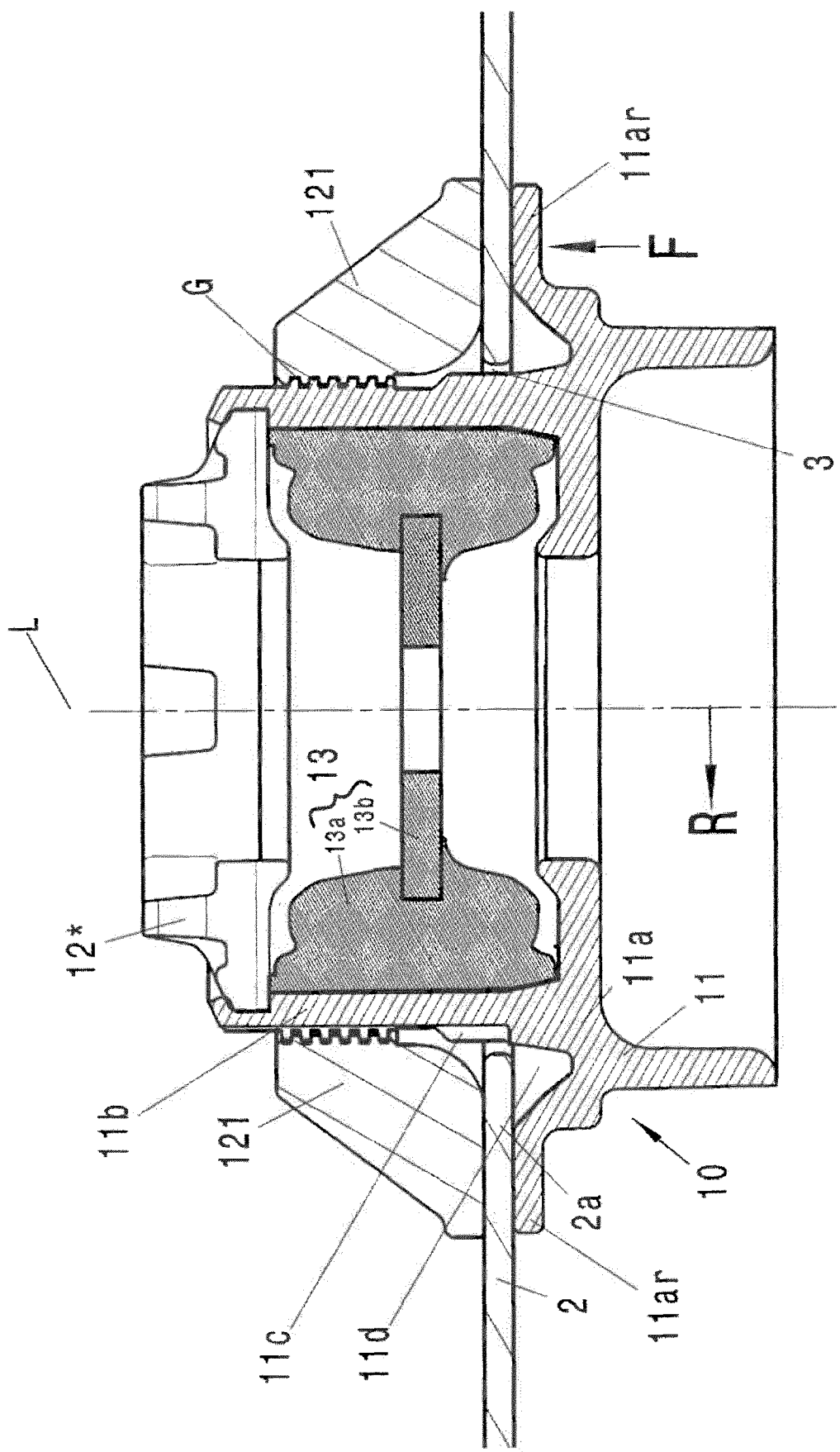
FIG. 2A is a section view of a second exemplary embodiment.

In reference first of all to FIGS. 1 and 2A, said figures show merely a supporting bearing 10 for a piston rod of a customary vibration damper in the wheel suspension system of a two-track vehicle, but not said piston rod which extends in the direction of a longitudinal axis L which is shown in the figures and, as is customary, is the symmetry or rotational axis of the approximately rotationally symmetrical supporting bearing 10, via which said piston rod is supported, mounted or fastened on a vehicle body structure 2 of the vehicle. For this purpose, the vehicle body structure 2 which is shown merely in a very fragmented way is designed, for example, as is customary as what is known as a suspension strut dome, and has a circular passage opening 3, in which the supporting bearing (identified in its entirety by way of the designation 10) for the damper ("damper" is a synonym for "vibration damper") is arranged.

Constituent parts of the supporting bearing 10 are, in particular, a supporting bearing flange 11, a fundamentally customary supporting bearing cover 12* and, furthermore, what is known as a supporting bearing nut 120 (FIG. 1) or 121 (FIG. 2A) here and, (as is customary) a bearing element 13 of elastomer/metal mixed design configuration for the piston rod. The bearing element 13 is arranged or mounted here in the supporting bearing flange 11 and, for its part, supports the piston rod of the damper in a customary way. In the present case, the figures do not show a spring cap, via which a bearing spring (likewise not shown) is supported in a customary way in a region F of the supporting bearing 10. Via a bearing spring of this type, the vehicle body of the vehicle is supported proportionally on that wheel suspension system or on that wheel of the vehicle which is assigned the damper.

The supporting bearing flange 11 which is at least approximately rotationally symmetrical with regard to the damper longitudinal axis L has an annular basic structure 11a which, in the installed state in the vehicle, lies approximately horizontally, and from which a circular-cylindrical collar 11b upwardly protrudes in the illustration of the figures and in the actual installed state, concentrically with respect to the damper longitudinal axis L. By way of said collar 11b, the supporting bearing flange 11 penetrates the passage opening 3 in the vehicle body structure 2, a ring section 11ar of the basic structure 11a, which ring section 11ar lies outside the collar 11b in the radial direction R with regard to the longitudinal axis L, bearing against the underside of the vehicle body structure 2. That ring segment of the vehicle body structure 2, against which the abovementioned ring section 11ar of the basic structure 11a bears, is called the edge ring section 2a of the vehicle body structure 2 with regard to the passage opening 3. The circular-cylindrical collar 11b (which describes a hollow cylinder) has an external thread on its outer-side circumferential face, onto which external thread the supporting bearing nut 120 or 121 (which is designed or can be designed in the same way as a customary screw nut) is screwed with its internal thread. Said internal thread and said external thread are denoted overall by way of the letter G.

Briefly describing the arrangement of the abovementioned bearing element 13 which acts as it were as a bearing block for the piston rod 1 of the damper 1 in the supporting bearing flange 11, said bearing element 13 is formed, as is customary in the case of damper supporting bearings, by way of an approximately hollow-cylindrical elastomer element 13a which engages around and therefore supports a circularly annular metallic disk 13b in its edge region. The piston rod of the damper is plugged with a threaded rod section through a central passage opening in the disk 13b and is fastened to the latter by means of a screw nut (not shown).

Making reference now to the exemplary embodiment of FIG. 1, an auxiliary clamping element 16 is provided in the case of this exemplary embodiment between the supporting bearing nut 120 and the edge ring section 2a of the vehicle body structure 2, which auxiliary clamping element 16 acts both as a washer and as a slightly resilient element, and which ensures, in particular, the maintaining of the required clamping force for securing the supporting bearing flange 11 on the vehicle body structure 2 under all circumstances.

Furthermore, on account of its washer function, the auxiliary clamping element 16 also protects the vehicle body structure 2 which has usually already been painted before the mounting of the supporting bearing 10 against damage or abrasion of the paint layer during tightening of the supporting bearing nut 120. In particular, however, the auxiliary clamping element 16 has a spring property to a certain but sufficient extent in the manner of a cup spring which lies between the edge ring section 2a of the vehicle body structure 2 and the supporting bearing nut 120, and therefore ensures the maintaining in all (adverse) circumstances of a sufficient clamping force (or prestress) in the screw connection which is formed by the supporting bearing nut 120 and by way of the collar 11b of the supporting bearing flange 11, which collar 11b is provided with the thread G.

In the present case, the spring property is achieved substantially by way of the shape of the auxiliary clamping element 16. The latter namely has an annular flange 16a, by way of which it lies on the edge ring section 2a of the vehicle body structure 2. Said annular flange 16a is adjoined by a transition section 16b which merges into what is known as a force transmission section 16c which is configured in the manner of a hollow cylinder with the longitudinal axis L of the thread G and encloses a section of the collar 11b. The supporting bearing nut 120 lies on the force transmission section 16c or acts on it in a pressing manner during tightening. The auxiliary clamping element 16 can act as a cup spring by virtue of the fact that, as viewed from the longitudinal axis L of the thread G (and therefore as viewed from the inside as it were), the transition section 16b runs in an inclined or oblique manner with respect to the longitudinal axis L of the thread G and therefore forms a conical wall section, with the result that, as viewed in the longitudinal axial direction L of the thread G, the force transmission section 16c does not lie on the edge ring section 2a of the vehicle body structure. This effect is reinforced by virtue of the fact that the transition section 16b of the auxiliary clamping element 16 runs in an inclined manner with respect to the longitudinal axis L of the thread G even in the case of a consideration from the outside.

Furthermore, a plurality of supporting ribs 16*d* are provided on the transition section 16*b* of the auxiliary clamping element 16 in a manner which is distributed over its circumference, via which supporting ribs 16*d* the spring rate or spring stiffness of the auxiliary clamping element 16 can be fixed in a targeted manner in conjunction with the wall thickness of the transition section 16*b*. In the present case, said supporting ribs 16*d* are provided on the wall inner side of the transition section 16*b* which represents a hollow truncated cone. As an alternative, supporting ribs of this type which, as viewed in a projection onto the longitudinal axis L, coincide with their course as it were with said longitudinal axis L can also be provided on the outer side of the circumferential face of said truncated cone. In the last-mentioned case, in particular, or if no supporting ribs are situated on the inner side, a further advantage of said auxiliary clamping element 16 can consist in that it bridges unevennesses in the edge ring section 2*a* of the vehicle body structure 2. Unevennesses of this type can result, for example, from welding spots between various vehicle body panels which meet one another in said edge ring section 2*a* and are welded to one another here.

Furthermore, it is to be noted that, in the present case, the supporting bearing nut 120 and the supporting bearing cover 12\* are separate components which are divided from one another, but can also be of different design, that is to say, in particular, the supporting bearing nut 120 and the supporting bearing cover 12\* can be a contiguous "common" component. Otherwise, in the exemplary embodiment which is shown, the collar 11*b* of the supporting bearing flange 11 is plugged through the passage opening 3 of the vehicle body structure 2 from that side of said vehicle body structure 2 which faces the vibration damper 1 or its damper piston or from that side of said vehicle body structure 2 which faces the wheel suspension system. The result is that the supporting bearing nut 120 is situated on that side of the vehicle body structure 2 which faces away from the wheel or the actual wheel suspension system, but this can also be designed in the reversed arrangement.

The design of the supporting bearing cover 12\* is also to be noted briefly, which supporting bearing cover 12\* (likewise) has approximately the design of a hollow circular-cylindrical ring here, on the inner wall of which (as shown in the figures) some cutouts which do not have separate designations are provided. A counterholder (not shown) can act on said cutouts during the automatic screwing of the supporting bearing nut 120.

Figure 2B:
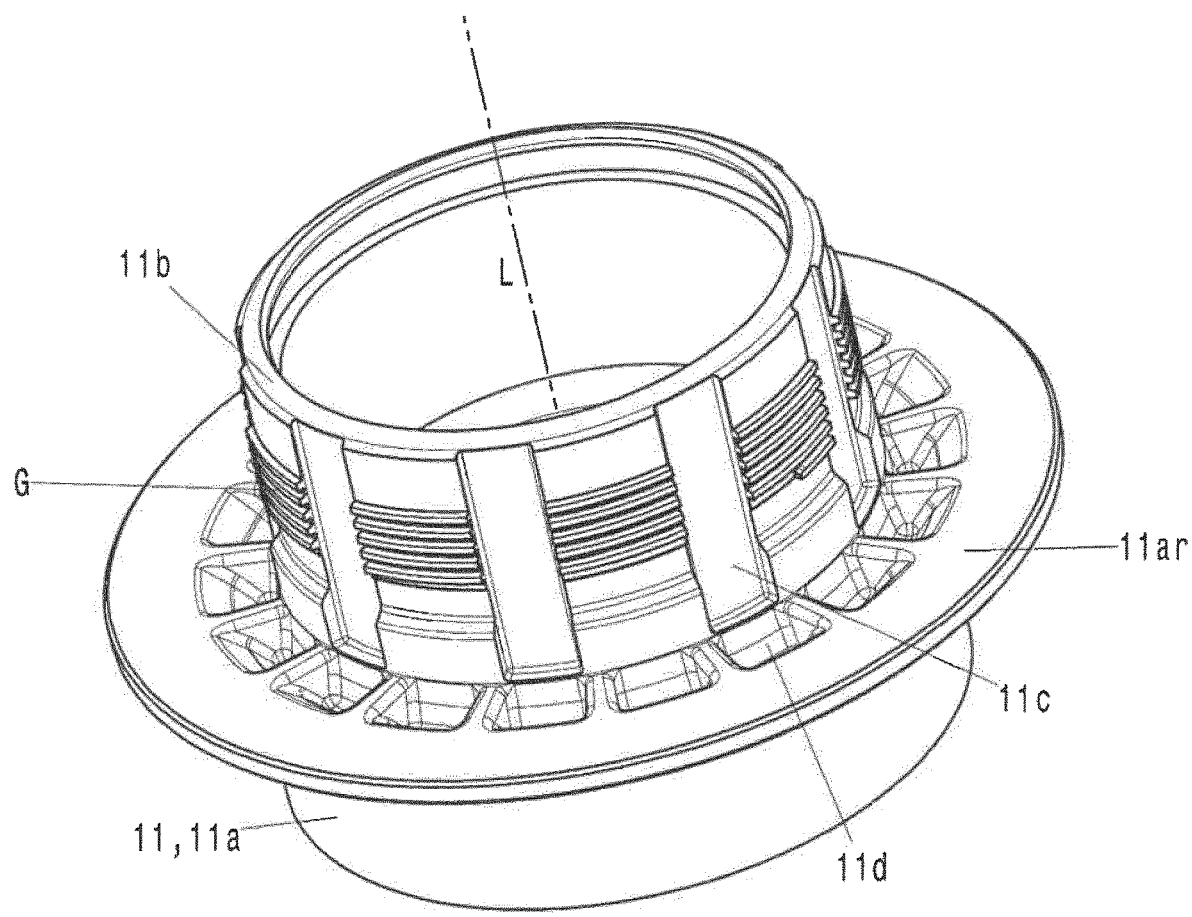
FIG. 2B shows the supporting bearing flange according to an embodiment of the invention on its own in an isometric view.

Describing the second exemplary embodiment according to FIG. 2A and FIG. 2B now, it can be seen in FIG. 2A that some elements are designed in a similar manner to the first exemplary embodiment, but that no auxiliary clamping element (16) is provided, but rather that the supporting bearing nut 121 lies directly here on the edge ring section 2*a* of the vehicle body structure 2. In the case of this exemplary embodiment, the necessary prestress or clamping force in the screw connection which is formed by way of the supporting bearing nut 121 and the collar 11*b* of the supporting bearing flange 11 (with said thread G) is ensured by way of a measure or shape for increasing the elasticity of the collar 11*b* in the direction of the longitudinal axis L of the thread G. Here, said elasticity-increasing shape of the collar 11*b* is formed by way of a plurality of segments 11*c* and sectors 11*d* in the wall of the collar 11*b* or in a transition region between the basic structure 11*a* and the collar 11*b* of the supporting bearing flange 11. These segments 11*c* and sectors 11*d* have a reduced wall thickness in comparison with a section of the respective structure which adjoins them. Here, said segments 11*c* are provided in the region of the thread G and have (as shown in FIG. 2B) approximately the shape of a rectangle, the longer edge of which runs parallel to the longitudinal axis L of the thread G. In contrast, said sectors 11*d* are situated in the transition region from the collar 11*b* to the basic structure 11*a* or in an annular section of the basic structure 11*a*, which annular section is adjoined by the abovementioned ring section 11*ar* of the basic structure 11*a*. It goes without saying here that only said segments 11*c* or said sectors 11*d* are also provided in each case multiple times, and are preferably provided distributed uniformly over the circumference of the supporting bearing flange 11.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A supporting bearing of a vibration damper or a damper/spring unit in a wheel suspension system of a vehicle, comprising:
   a supporting bearing flange which is supported on and fastened in a non-positive manner to a vehicle body structure of the vehicle, wherein
   the supporting bearing flange engages around an annular elastomer element, in which an element of the vibration damper is suspendable, and
   the supporting bearing flange penetrates a passage opening in the vehicle body structure with a circularly annular collar which forms a hollow cylinder and a cylinder axis of which coincides at least approximately with a longitudinal axis of the vibration damper;
   a supporting bearing nut or a supporting bearing cover configured as a union nut is screwable onto a thread which is provided on an outer wall of said collar, wherein
   the supporting bearing nut or supporting bearing cover draws the supporting bearing flange toward the vehicle body structure in a manner which is supported on the vehicle body structure, wherein an edge ring section of the vehicle body structure that surrounds the passage opening is clamped in between the supporting bearing flange and the supporting bearing nut or the supporting bearing cover;
   the collar has a shape which increases its elasticity in the direction of the longitudinal axis of the thread and/or an auxiliary clamping element is clamped in between the supporting bearing nut and the vehicle body structure, wherein the elasticity-increasing shape of the collar and the auxiliary clamping element increase a prestressing force in the threaded connection between the supporting bearing nut and the collar;
   the elasticity-increasing shape of the collar is formed by way of a plurality of segments and a plurality of sectors with a reduced wall thickness in comparison with a respective adjoining wall section, wherein the plurality of segments are disposed in a region of the thread of the collar and wherein the plurality of sectors are disposed in a transition region between the collar and an annular basic structure of the supporting bearing flange from which the collar protrudes or in the annular basic structure; and the auxiliary clamping element has an annular flange which lies on the vehicle body structure and a hollow-cylindrical force transmission section which adjoins said annular flange directly or indirectly, extends in a direction of the longitudinal axis of the thread toward the supporting bearing nut or toward the supporting bearing cover, and has a diameter which is smaller than an external diameter or a mean diameter of the annular flange.

2. The supporting bearing according to claim 1, wherein the auxiliary clamping element has, as viewed from the outside, a linear, concavely or convexly curved transition section between the annular flange and the hollow-cylindrical force transmission section, which transition section is inclined with respect to the longitudinal axis of the thread and, as viewed from the longitudinal axis of the thread, likewise runs in an inclined manner with respect to the longitudinal axis of the thread, such that, as viewed in the longitudinal axial direction of the thread, the force transmission section does not lie on the edge ring section of the vehicle body structure, whereby the auxiliary clamping element has, in a cup spring manner, a spring property in the direction of the longitudinal axis of the thread.

3. The supporting bearing according to claim 1, wherein a plurality of reinforcing ribs are provided on the auxiliary clamping element between the annular flange and the hollow-cylindrical force transmission section or on the transition section.

4. The supporting bearing according to claim 1, wherein the supporting bearing flange is plugged with its collar through the passage opening from that side of the vehicle body structure which faces the vibration damper or the wheel suspension system.

* * * * *